Dec. 4, 1945. W. W. DAVIDSON Re. 22,702

PRINTING PRESS

Original Filed Oct. 3, 1939 4 Sheets-Sheet 1

Inventor:
William Ward Davidson
By Marks, Brown & Co
Attys.

Dec. 4, 1945. W. W. DAVIDSON Re. 22,702
PRINTING PRESS
Original Filed Oct. 3, 1939 4 Sheets-Sheet 2
Fig. 2
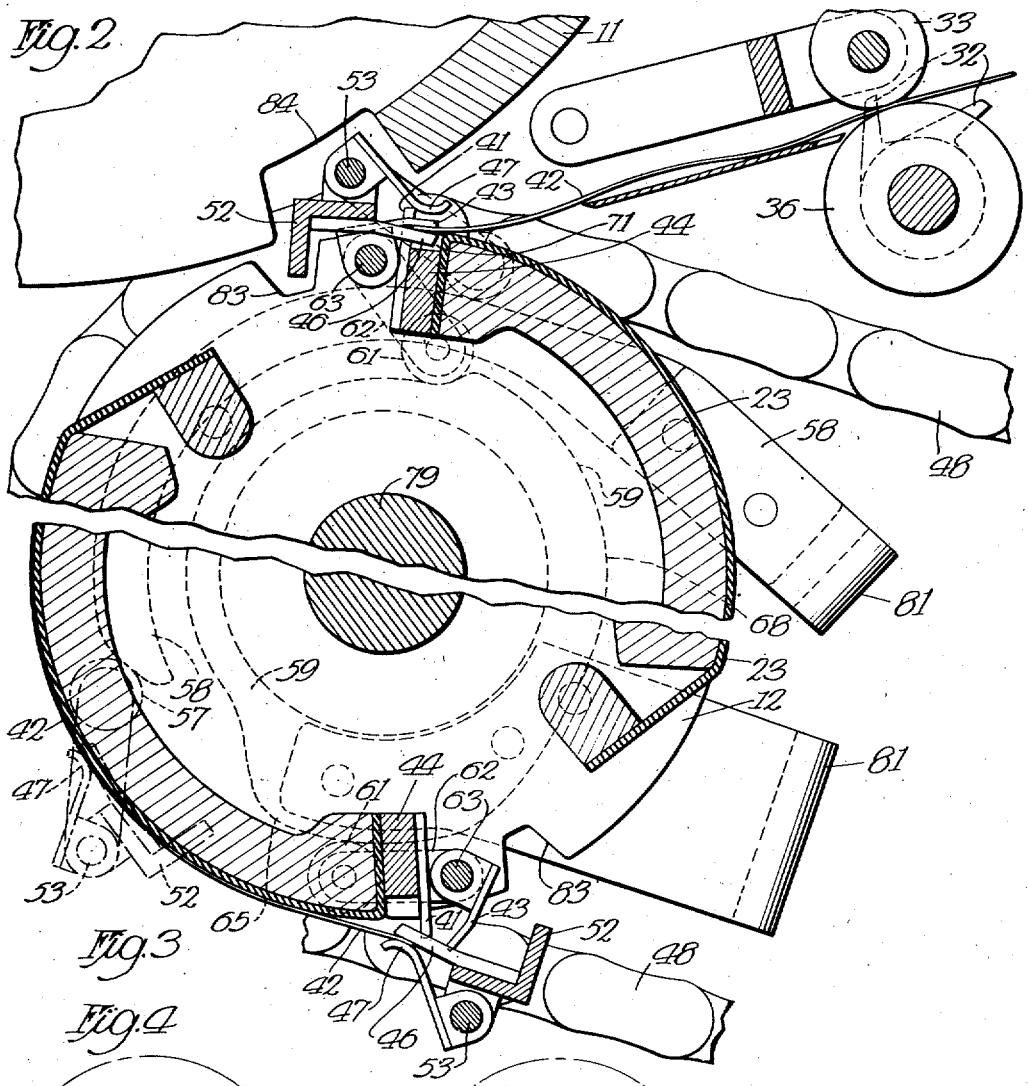
Fig. 3
Fig. 4
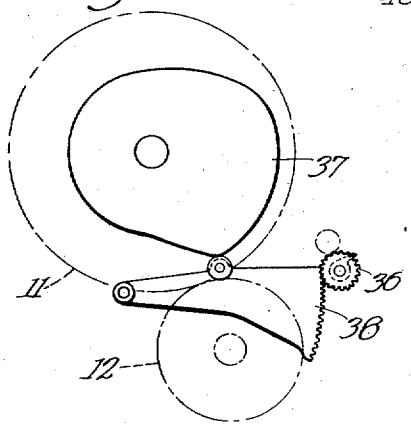
Fig. 5
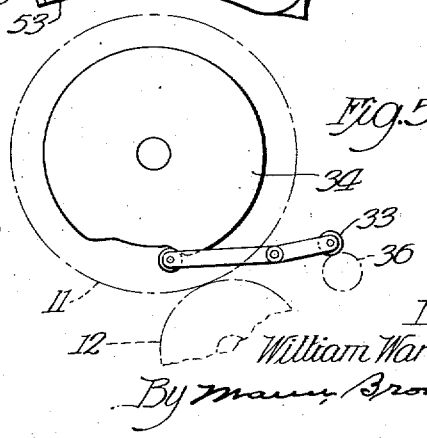
Inventor:
William Ward Davidson
By Marry, Brown & Co
Attys.

Dec. 4, 1945. W. W. DAVIDSON Re. 22,702

PRINTING PRESS

Original Filed Oct. 3, 1939 4 Sheets-Sheet 3

Inventor:
William Ward Davidson,
By Mann, Brown & Co.
Attys.

Dec. 4, 1945. W. W. DAVIDSON Re. 22,702

PRINTING PRESS

Original Filed Oct. 3, 1939 4 Sheets-Sheet 4

Inventor
William Ward Davidson
By Manny, Brown & Co
Attys.

Reissued Dec. 4, 1945

Re. 22,702

UNITED STATES PATENT OFFICE 22,702

PRINTING PRESS

William Ward Davidson, Evanston, Ill., assignor to Davidson Manufacturing Corporation, Chicago, Ill., a corporation of Illinois Original No. 2,280,799, dated April 28, 1942, Serial No. 297,745, October 3, 1939. Application for reissue January 29, 1944, Serial No. 520,351

21 Claims. (Cl. 101—217)

In some types of printing presses, it is necessary to provide a sheet delivery apparatus which grasps the sheet and draws it away from the printing rolls. With small sheets an efficient stripping blade may be satisfactory, but with large sheets, especially thin sheets which have very little rigidity, a press with such a stripper cannot throw the sheets out uniformly and dependably. With large presses it is, therefore, customary to provide means for gripping the leading edge of the sheet adjacent to the printing rolls and pulling the sheet away to a desired position at which it is released to fall onto a stack. These gripping means are sometimes carried by chains and are appropriately called chain deliveries.

It has also been common to provide gripping means on the printing cylinders, as, for example, on the blanket rolls of an offset printing press. This latter type of gripping means, together with a registration stop coacting therewith, has been considered necessary to secure accurate registration. These registration grippers usually passed the sheet to the delivery grippers, which were carried by their chains around sprockets tangential to the blanket roll. According to the present invention, the chains are carried on sprockets concentric with the blanket roll with resultant simplicity and compactness. According to one form of the invention, a single gripping mechanism is made to serve both purposes with resulting economy and simplicity.

The compactness and simplicity are especially notable and satisfactory because of the use of a particular type of press in combination with the above described feature of having the chain delivery run around one of the printing cylinders. The press referred to is an offset press in which the blanket roll is positioned generally below the platen roll, as in a two-roll press in which the upper roll serves both as a plate roll and a platen roll. With this type of press, the sheet is printed on its underside, and it has been common, therefore, to carry it half-way around the blanket roll so as to turn it over. Thus, the sheet is fed into the press at one side thereof, carried half-way around the blanket roll, and ejected from the press at the same side of the press on which it was fed to the press. This fact is ingeniously used according to the illustrated embodiments of the present invention by providing a chain gripping mechanism in which the grippers follow the simple path of a single closed loop. In short, the chains form a single loop extending around the blanket roll, approaching it and departing from it on the same side of the press, namely the side at which the sheets are fed and delivered. As the chain delivery grippers approach the blanket roll and pass over it, the sheet is fed against registration stops on the blanket roll, and the grippers (either on the chain or on the roll or both) grip the sheet to hold it against the stops and thus ensure accurate registration. As the sheet passes half-way around the roll, it is gripped or continues to be gripped by the grippers carried by the chain which draw it away from the roll to a delivery position at which time the grippers are opened and the sheet is dropped on a stack.

Additional advantages and objects of the invention will be apparent from the following description and from the drawings, in which Fig. 1 is a somewhat diagrammatic view of one form of the invention chosen for illustration.

Fig. 2 is a somewhat diagrammatic sectional illustration showing the grippers of the roll gripping a sheet which has just been fed to them, while the grippers of the chain remain open.

Fig. 3 is a corresponding view showing the chain grippers stripping the sheet from the blanket roll.

Figs. 4 and 5 are somewhat diagrammatic illustrations indicating the final steps in the operation of the feeding mechanism.

Figure 1:
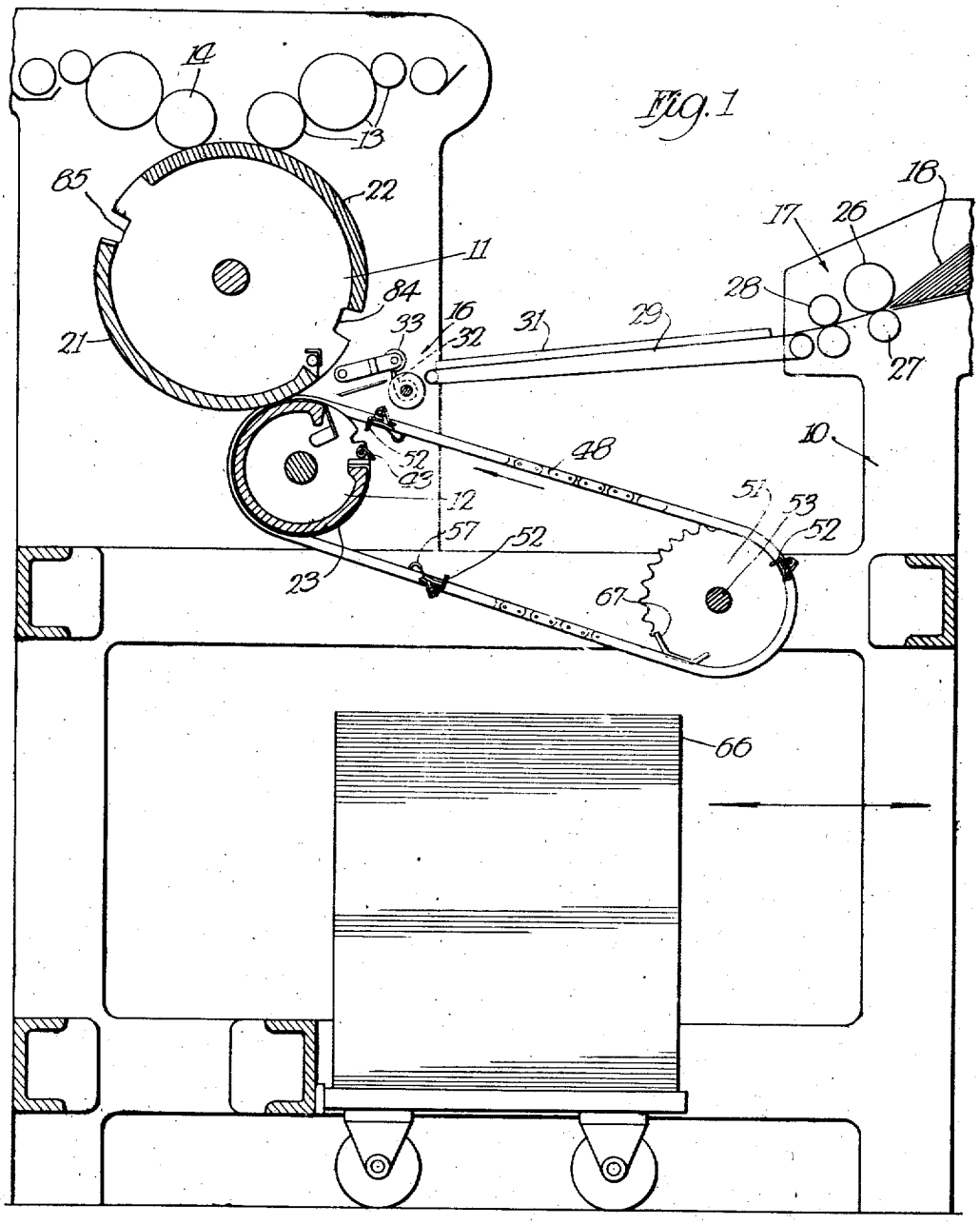

Two preferred embodiments of the invention have been shown in the drawings and will hereinafter be described all as required by section 4888 of the Revised Statutes, but many other forms could be used within the spirit of the invention.

In the form of the invention chosen for illustration, the printing press includes a frame 10, printing rolls 11 and 12, inking rolls 13, dampening rolls 14, final feeding mechanism indicated generally at 16, and preliminary feeding or separating mechanism indicated generally at 17, all of which may be of conventional types. The separator 17 separates sheets from a stack 18. Of course, the term "printing press" might be used more narrowly to include only the printing rolls 11 and 12.

The printing roll 11 is a dual purpose roll, having a plate 21 on one side thereof and a platen surface 22 on the other side thereof. The roll 12 is a blanket roll or transfer cylinder, being provided with a blanket 23. It is thus seen that in its illustrated form, the press is of the type known as a two-roll offset press. In the general operation of this press the plate 21, which bears the matter to be printed, is rotated in contact with the dampening rolls 14 and is then inked by the inking rolls 13. It then rotates in direct contact with the blanket 23, transferring the ink thereto. During this application of ink to the blanket 23, the blanket roll 12 makes a revolution without any sheet in contact therewith and hence without performing a printing function. On its next revolution, a sheet is fed to the blanket roll 12 and pressed thereon by the platen surface 22 of the roll 11 so that the ink on the blanket 23 is printed onto the sheet. The term "impression roll" will be confined herein to the member such as the roll 12 which actually applies the ink to the sheets as distinguished from platen rolls which may have been called impression rolls in other patents.

The sheet separating and feeding means may be of any suitable form. It is illustrated as including an advancing roller 26 which is driven intermittently to draw a sheet from the pile 18 at the proper time during each revolution of the roll 11, a retard roller 27 for preventing more than one sheet from being fed at a time, and pull-out rollers 28 for drawing the sheets out after the driving of roller 26 has ceased, the roller 26 being provided with an over-running clutch. Inclined conveyor belts 29 urge the sheet against the side guide 31 to provide lateral registry against stop fingers 32 to provide preliminary end registry. While the sheet is thus pressed against stop fingers 32, pressure roller 33 is lowered by the cam 34 of Fig. 5 to cooperate with feed rollers 36 in gripping the sheet. When the sheet is thus firmly gripped, cam 37 of Fig. 4 drives a gear segment 38 to rotate stop fingers 32 and feed roller 36 to feed the sheet, the shape of the cam 37 and the positions of the parts being such that the sheet is rapidly moved at a speed in excess of the peripheral speed of rolls 11 and 12.

To provide final accurate registration, stop fingers 41 are, in the form seen in Fig. 2, provided on roll 12 and the sheet 42 is fed against these stop fingers by feeding roller 36 actuated as stated, by cam 37. The sheet 42 is preferably overfed slightly by roller 36 so as to be buckled and pressed firmly against the stop fingers 41. While it is thus pressed firmly against the stop fingers 41, gripping fingers 43 are closed upon the sheet 42, clamping it against an anvil 44. These grippers comprising the fingers 43 and anvil 44 hold the sheet firmly in its registered position and carry it beyond the line of the bite between rolls 11 and 12 where it is firmly seized by these rollers. Once it is seized in this bite, the accuracy of registration is determined since the rolls 11 and 12 themselves prevent shifting of the sheet out of registration.

Figure 6:
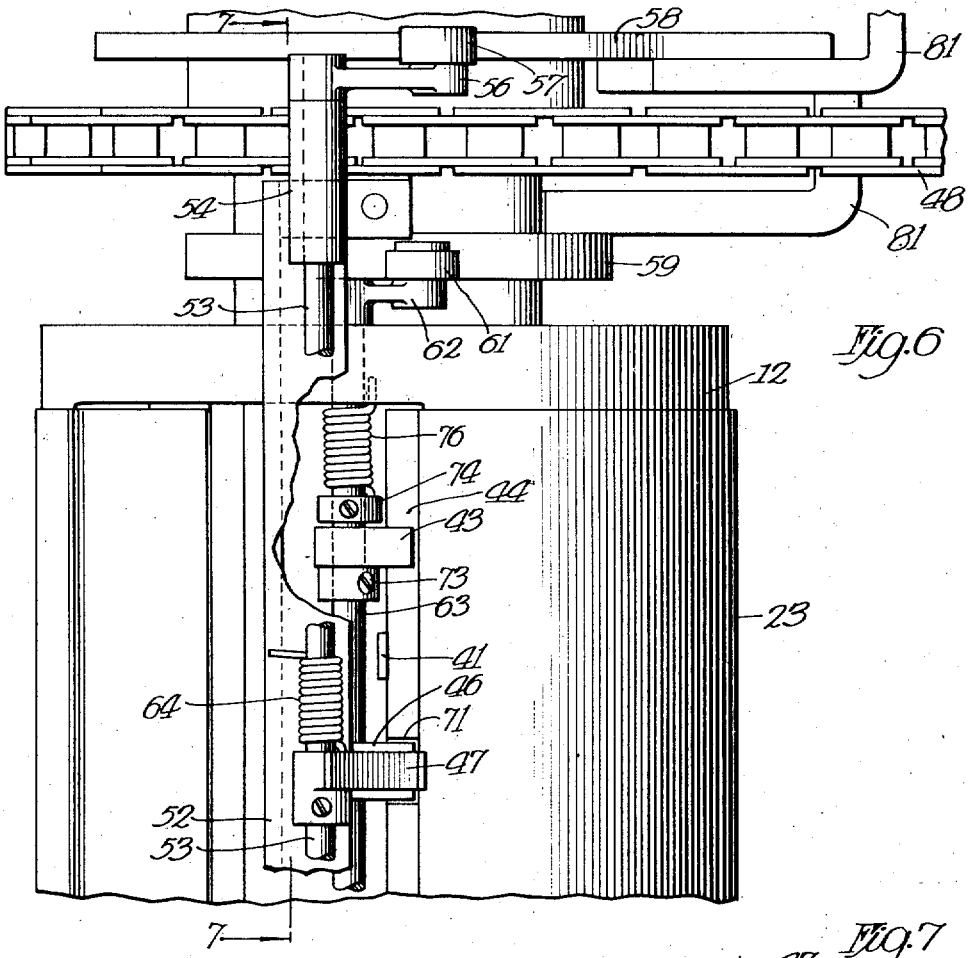
Fig. 6 is a somewhat diagrammatic fragmentary plan view of the registration and delivery mechanism of Figs. 1 to 3.
Figure 7:
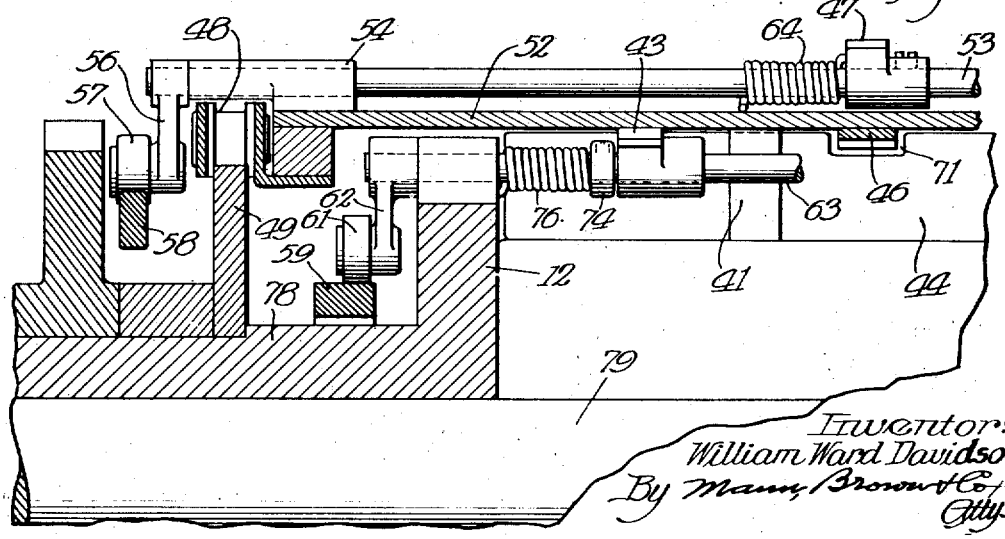
Fig. 7 is a somewhat diagrammatic fragmentary detail sectional view taken approximately on the line 7—7 of Fig. 6.

A second set of grippers comprising anvils 46 and grip fingers 47 is carried by chains 48. One of the chains 48 is positioned adjacent each end of the roll 12, one end of the roll being shown in Figs. 6 and 7 and the other end being a substantial duplicate thereof insofar as the chains 48 are concerned. As seen in Fig. 7, each set is carried on a sprocket 49 rotating with the roll 12. The other end of each chain is carried by a sprocket 51 mounted on a shaft 53 carried by the frame 10 of the press. Carried by the chains 48 and extending between them are three angle bars 52 spaced apart on the chains a distance corresponding to the periphery of the sprocket 49. Each angle bar 52 carries anvil fingers 46 and supports the grip fingers 47 which are carried by and keyed to shaft 53. The shafts 53 are journaled in brackets 54 carried by angle bars 52. Each shaft 53 has an operating lever 56 secured at its end, the lever 56 bearing a roller 57 which is adapted to engage cam 58.

As each bar 52 approaches the roll 12 or the feeding position thereon, roller 57 rides up on cam 58 thereby turning shaft 53 and opening grip fingers 47 to the position shown in Fig. 2. The grip fingers 43 are in the meantime held open by cam 59 engaging roller 61 on arm 62 which actuates shaft 63 carrying the grip fingers 43. When the sheet 42 has been fed against the stops 41, roller 61 rides off of the high portion of cam 59 and permits fingers 43 to close on the sheet 42.

After the rolls rotate further and the sheet 42 has been gripped in the bite between rolls 11 and 12, roller 57 rides off of cam 58, permitting the second set of grip fingers 47 to close upon the sheet 42, as seen in dotted lines in Fig. 3, under the influence of spring 64. After fingers 47 have closed upon the sheet 42, roller 61 rides onto the highest portion 65 of cam 59 thereby opening the first grip fingers 43 to the position shown in Fig. 3. The bar 52 is now carried by the chains 48 away from the roll 12, the grippers 46 and 47 carried by the bar 52 pulling the sheet 42 off of the roll 12 as seen in full lines in Fig. 3. It will be observed that because of the fact that the two sets of grippers are in alignment through a substantial part of the revolution of roll 12, the closing of one set of grippers and the opening of the other may be performed quite leisurely and there is no necessity for delicate adjustment of these opening and closing times as would be the case if a sheet were being passed from grippers on one roll to grippers on another roll or a chain tangentially disposed with respect to the first roll.

The sheet 42 continues to be gripped by the grippers 46 and 47 until the sheet has been drawn to a position over the pile 66 or over any other suitable discharge receptacle or table, at which time the roller 57 strikes cam 67, and the grip fingers 47 are opened to release the sheet 42 so that it may drop upon the pile 66.

As the roll 12 continues to rotate, roller 61 rides off of the extremely high portion 65 of the cam 59 and onto the intermediate portion 68 thereof, thereby permitting the fingers 43 to assume an intermediate position approximately even with the outer ends of stop fingers 41 so that they in effect form an overhanging extension for the stop fingers 41 to positively prevent the next sheet 42 from buckling over and slipping past the stop finger 41. It will also be observed that as the sheet 42 is fed to the stop fingers 41 the gripper fingers 47 are positioned approximately even with the top of the stop fingers 41 and have upwardly curved toes so that they also aid in guiding the sheet 42 to its proper position against the stop finger 41. As a matter of fact, at the time that the sheet is fed to the stop finger 41 it is inclined somewhat toward the feed roller 36 so that when the sheet strikes the stop 41 it tends to slide down the stop 41 (if not already at the base thereof) and come to rest at the proper point in the corner formed by the stop 41 and the anvil 44.

The grip finger 47 is not closed on the sheet 42 until after the sheet 42 has been engaged by the rolls 11 and 12 for the reason that this may give greater certainty of registration in that there will be absolutely no chance that movement of the grip fingers 46 and 47 with respect to the roll 12 will shift the sheet 42. In short, during the crucial period this form of the invention contemplates that the sheet 42 will be in control of the gripping fingers 43 and the anvil 44 which are immovable with respect to the roll 12 except the opening motion of gripping fingers 43, which motion does not occur during the crucial registration period.

It will be observed that the anvil 44 is in fact a bar extending across the roll 12 and it may be the bar used for securing one end of the blanket 23. This anvil or bar 44 is notched as seen at 71 to receive the anvil fingers 46. Although experience may show that with some presses more grippers are desirable for the chain delivery, it is believed that two grippers each comprising an anvil 46 and a gripping finger 47 will be sufficient if they are positioned just close enough together to receive the narrowest sheets which are likely to be run on the press, being spaced approximately equally from the center of the roll. It may be desirable to provide a larger number of the registration grip fingers 43 and to make them adjustable so that one of them may always be positioned near each outer edge of the sheet with intermediate grippers in the case of wide sheets so that the sheet may be held with maximum firmness. To this end the gripping finger 43 may be adjustably positioned on shaft 63 by set screw 73, the stop finger 43 being maintained in constant angular position with respect to shaft 63 by some sort of splining arrangement or noncircular engagement with the shaft 63. A separate collar 74 may be provided for effectively connecting a spring 76 to shaft 63 to urge the fingers 43 in the closed direction.

As seen in Fig. 7, the hub 78 of the roll 12 rotates with the roll and, indeed, may be used for driving the roll. It is therefore necessary that the cams 58 and 59 be supported independently of the shaft 79, which carries roll 12, and therefore brackets 81 may be provided for these cams as seen in Fig. 6, these brackets of course extending around a moving part of the press to a stationary portion of the frame.

It will be observed that the end walls of roll 12 are cut out as seen at 83 and the end walls of roll 11 are cut out as seen at 84 for the purpose of making room for the passage of the transverse members of the chain delivery, namely the bar 52 and the shaft 53. If, as illustrated in Fig. 1, the chain 48 is of a length corresponding to three revolutions of blanket roll 12, it must be provided with a crossbar 52 for each revolution. In this event the walls of roll 11 should be cut out at 85 at a position diametrically opposite the cut-outs 84. However, if chain 48 were one revolution longer, the crossbars 52 could be spaced two revolutions apart and the cut-out 85 would not be needed. It will be observed that it is not necessary for these transverse members or any other part of the chain delivery to contact either the roll 11 or the roll 12 since the sheet is registered independently of their exact positioning with respect to the rolls 11 and 12. This is very desirable because if it is attempted to position the chain delivery with exactitude with respect to the roll 12 by having it wedged into V-shaped formations thereof, for example, a very noisy machine is likely to result or considerable expense may be required to avoid the noise.

Figure 8:
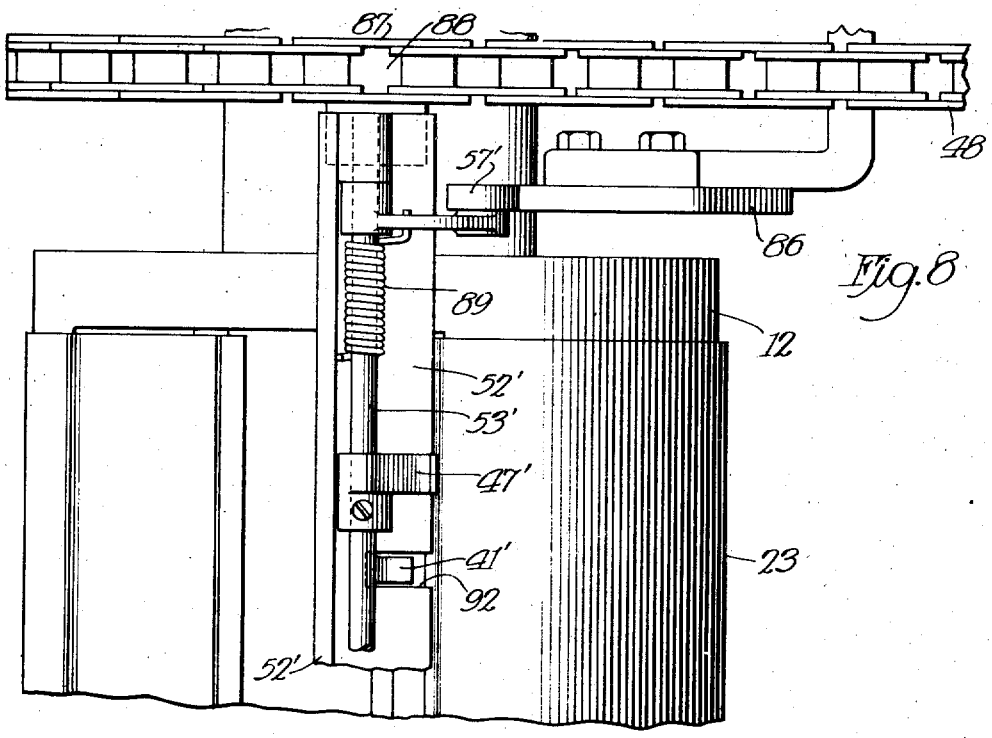
Figs. 8 and 9 are views corresponding to Figs. 6 and 7 but showing a modified and simpler form of the invention.
Figure 9:
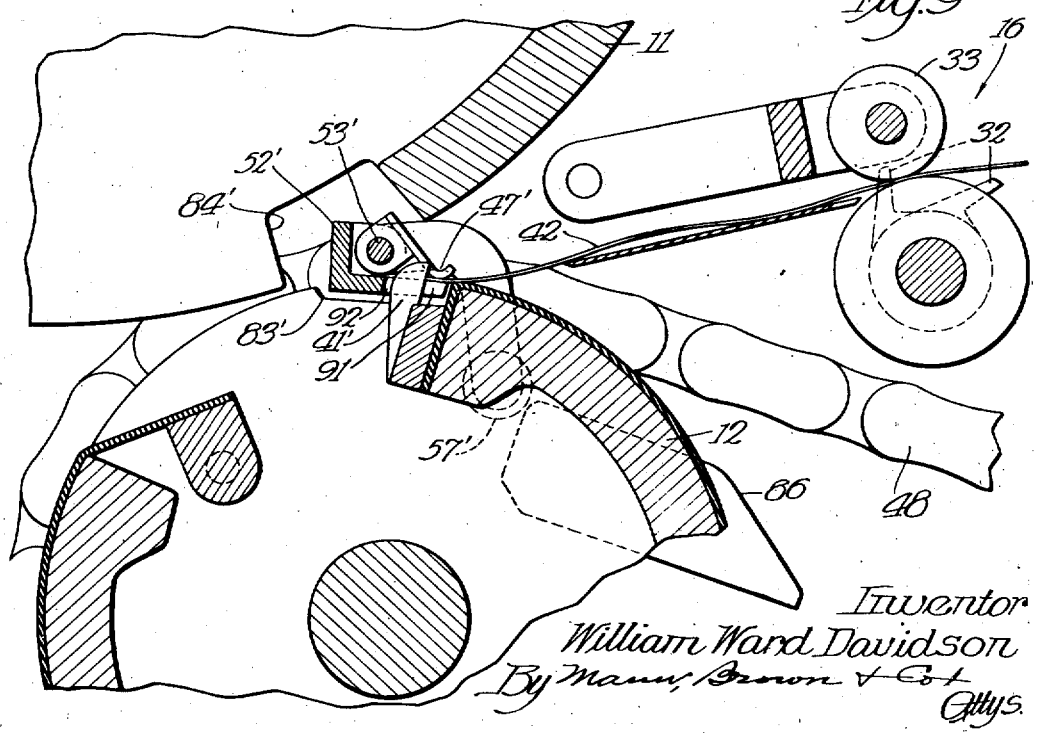

In Figs. 8 and 9 a form of the invention has been illustrated which is greatly simplified by the omission of the grip fingers carried by the roll 11. In view of the common knowledge for the necessity of extreme accuracy of registration for fine printing work, it may be surprising that this registration can be accomplished through the aid of grip fingers carried by the chains 48. It is accomplished, however, by the very simple expedient of utilizing stop fingers which are independent of variations between successive chain-carried grippers, as are stop fingers 41′ carried by the roll 12, and taking advantage of the fact that regardless of variations in the relative positioning of cross bars 52′ with respect to the roll 12 on successive occasions of their meeting, there will ordinarily be no variation in their relative positions during the occasion of one meeting after the links by which the cross bars 52′ are carried have been fully seated on the sprocket wheels. It has previously been contemplated to accurately position a crossbar such as the crossbar 52′, carrying gripping fingers and even stop means, by a V-type of coaction between such crossbar and the roll 12 which would automatically self-position the crossbar. Although this is a possible way of obtaining at least fairly good registration, the method illustrated in Figs. 8 and 9 is considerably simpler and at the same time more accurate and also quieter in operation.

The gripping fingers 47′ are carried and operated by shaft 53′ as seen in Figs. 1 to 7, although they may be longitudinally adjustable thereon if desired and more than two of them may be provided. These gripping fingers 47′ are controlled by roller 57′ in coaction with stationary cam 86. The position of cam 86 and the angularity of chain 48 should be such that at the time the roller 57′ rides off of the cam 86 the links 87 to which the crossbars 52′ are secured have become firmly seated on sprocket 88. It is not essential that the links 87 assume exactly the same position on the sprocket 88 each time that they engage it, but it is merely essential that once they are seated thereon they should not move with respect to it until after the sheet has been seized in the bite between the rolls 11 and 12. To this end the chain 48 could extend at a steeper angle than shown in Fig. 9 or the cam 86 could be extended to the left if it should be found that the fingers 47′ were closing before the crossbar 52′ had found its final position. Some suitable means, not shown, should be provided for shifting the shaft 53 in a direction to tighten the chains 48.

Fingers 47′ will be urged to the closed position by springs 89. It is possible that if these springs are exceptionally strong the cam 86 may result in rocking the bar 52′ slightly and thereby causing an undesirable movement of the sheet 42 with respect to the stop fingers 41′. If such should develop, this can be remedied by replacing the springs 89 with weaker springs. If with a particular press and a particular type of work it is found that the sheet is not then gripped firmly enough, other means for operating the grip fingers 47′ may be provided. For example, they could be operated by beveled pins operating arms at each end of the shaft 53, each of the beveled pins being moved in a direction parallel to the shaft by cams engaging the ends thereof so that the forces exerted by the cams will be in a direction axial of the shaft 53 and will cancel one another. Likewise, the fingers 47' could be operated by rocker members fulcrumed or pivoted on the crossbar 52' and operated by a cam which exerts a force radially inwardly toward the axis of roll 12 so that the force would merely tend to insure that the link 87 was firmly seated on sprocket 88.

As seen in Fig. 9, the end walls of rolls 11 and 12 may both be notched as shown at 83' and 84' to receive the transverse portions of the gripping mechanism, namely the crossbar 52' and the shaft 53'.

Of course, the notches 85 would likewise be provided as explained in connection with Fig. 1.

The anvil 91 has been illustrated as one flange of the angular crossbar 52', this flange being slotted at 92 to receive the stop fingers 41'. It should be observed that the size of the notches 83' and 84' and the slot 92 are such that there is no contact between the portions of the gripping mechanism carried by the chain and any other rotating mechanism except the sprocket wheels carrying the chains. This permits the press to be quite quiet in operation.

Except for the differences mentioned and apparent from the drawings, the construction and operation of the form of the invention shown in Figs. 8 and 9 may be the same as that of the form shown in Figs. 1 to 7.

From the foregoing it is seen that a press is provided having in conjunction therewith a chain delivery which is in its simplest possible form in that it comprises a single loop and extends around the shaft of one of the printing rolls so that a minimum of shafts and working parts may be used. Furthermore, the chain delivery drops the sheet printed-side-up so that the condition of the printing may be observed. In addition, the sheets are discharged at a position underneath the feeding conveyor table so that the overall length of the entire machine may be a minimum. In spite of this simplicity there is no interference with the accurate registration of the sheet since registration means may be provided in the same manner as if the chain delivery were not provided or extended around a different shaft than either of those on which the printing rolls are mounted. Furthermore, according to one form of the invention additional simplification is possible by omitting the gripping fingers from the printing roll and letting the gripping fingers of the chain delivery perform their function, accurate registration being obtained nevertheless by virtue of the mounting of the stop fingers independently of the chains, as on the printing roll, and designing the machine so that the gripping fingers are used only during the time that they are stationary with respect to the roll, irrespective of whether or not they may be in exacly the same position with respect to the roll the next time they are used for registration.

I claim:

1. An offset printing press including a blanket roll, a platen above the blanket roll, registration stop means carried by the blanket roll, feeding means adapted to feed sheets against the stop means, grippers associated with the blanket roll at least at the time a sheet is fed to the stop means, and means for holding said grippers open at that time and for closing at least part of them while the sheet is pressed against the stop means to hold the sheet in registration, at least part of the grippers being carried by endless means around the blanket roll and away therefrom for stripping the sheet from the blanket roll and delivering it at the desired point of delivery.

2. An offset printing press including a blanket roll, a platen above the blanket roll, and registration and delivery means including gripping means, means causing the gripping means to approach the roll, close upon the leading end of a sheet to be printed, assume a fixed position with respect to the roll and rotate about half a revolution with the roll, pass away from the roll generally toward the direction from which it approached the roll, and open to release the sheet at a point remote from the roll; means for feeding a sheet into the gripping means, and registration stop means which, as the gripping means closes on the sheet, is associated with the gripping means and is in an exactly predetermined position circumferentially with respect to the roll, to register the sheet with the roll.

3. An offset printing press including a blanket roll, a platen above the blanket roll, and registration and delivery means including gripping means, means causing the gripping means to approach the roll, close upon the leading end of a sheet to be printed, assume a fixed position with respect to the roll, pass away from the roll, and open to release the sheet at a point remote from the roll; means for feeding a sheet into the gripping means, and registration stop means which, as the gripping means closes on the sheet, is associated with the gripping means and is in an exactly predetermined position circumferentially with respect to the roll, to register the sheet with the roll.

4. An offset printing press including a blanket roll, a platen above the blanket roll, and registration and delivery means including chains each forming a simple closed loop extending around the axis of the blanket roll and off to one side thereof, gripping means carried by the chains, approaching the blanket roll and opened to receive a sheet at the upper side of the blanket roll, closed upon the sheet, and opened to release the sheet after passing around the blanket roll and carrying the sheet away therefrom, and registration stop means associated with the gripping means at the time that the sheet is fed thereto, the stop means being accurately positioned with respect to the blanket roll.

5. A printing press including two printing members, one of which is a roll coacting with the other to form a bite, registration stop means carried by one of the printing members, means for feeding a sheet toward the bite and against the stop means, grippers carried by the member which carries the stop means, means for opening the grippers to receive the sheet, closing them to hold the sheet in registration for the printing thereof, and subsequently opening them to release the sheet, a second set of grippers carried by endless means extending around the axis of the roll, and moved by the endless means through the bite approximately in alignment with the first grippers and away from the roll, and means for opening the second grippers as the sheet is fed against the stop means, holding them open until the sheet has been seized by the bite, thereafter closing the second grippers to engage the sheet and carry it away from the roll after the first grippers have opened, and for opening the second grippers to release the sheet at the desired delivery point.

6. A printing press including two printing members, one of which is a roll coacting with the other to form a bite, registration stop means carried by one of the printing members, means for feeding a sheet toward the bite and against the stop means, grippers carried by endless means extending around the axis of the roll, and moved by the endless means through the bite and away from the roll, and means for opening the grippers as the sheet is fed against the stop means, closing the grippers to engage the sheet while the sheet is pressed against the stop means by the feeding means, held in registration for printing and carried away from the roll, and for opening the grippers to release the sheet at the desired delivery point.

7. A printing press including two printing members, one of which is a roll coacting with the other to form a bite, registration stop means and grippers carried by the roll, means for feeding a sheet toward the bite and against the stop means, means for opening the grippers to receive the sheet, closing them to hold the sheet in registration for the printing thereof, and subsequently opening them to release the sheet, a second set of grippers carried by endless means extending around the axis of the roll, and moved by the endless means through the bite approximately in alignment with the first grippers, and away from the roll, and means for opening the second grippers as the sheet is fed against the stop means, holding them open until the sheet has been seized by the bite, thereafter closing the second grippers to engage the sheet and carry it away from the roll after the first grippers have opened, and for opening the second grippers to release the sheet at the desired delivery point.

8. A printing press including a rotating unit, a first set of grippers carried by the rotating unit, a second set of grippers carried by endless means extending around the rotating unit and away therefrom, the two sets of grippers being in alignment with one another for a substantial part of the revolution of the rotating unit, means for opening the second grippers to receive a sheet which during a part of the period of alignment is gripped by the first grippers, and means for closing the second grippers on the sheet and opening the first grippers during the remainder of the period of alignment to pass the sheet to the control of the second grippers whereby the sheet will be drawn away from the rotating unit by the second grippers.

9. The combination of a printing press including a printing roll, chains extending partly around the axis of the printing roll, rotating with the printing roll and extending away therefrom, gripping means carried by the chains and at times rigidly disposed with respect to the printing roll, means for feeding a sheet to the gripping means, and in predetermined registration with the printing roll, means for opening the gripping means to receive a sheet as it is fed to the gripping means and for closing the gripping means after the sheet is fed thereto, and while the gripping means is held rigidly disposed with respect to the printing roll and means for again opening the gripping means after the gripping means has carried the sheet away from the printing roll to release the sheet at the desired delivery point.

10. A printing press including two printing members, one of which is a roll coacting with the other to form a bite, registration stop means located in the same circumferential position with respect to the roll for successive sheets being printed and rotating with the roll during at least a part of the feeding and printing operation, means for feeding a sheet toward the bite and against the stop means, grippers carried by endless means extending around the axis of the roll, and moved by the endless means through the bite and away from the roll, and means for opening the grippers as the sheet is fed against the stop means, closing the grippers to engage the sheet while the sheet is pressed against the stop means by the feeding means, held in registration for printing, and carried away from the roll, and for opening the grippers to release the sheet at the desired delivery point.

11. A printing press including two printing members, one of which is a roll coacting with the other to form a bite, grippers carried by endless means around the roll, through the bite and away from the roll, registration stop means rigidly located circumferentially of the roll with respect to the grippers and in alignment with the grippers at the time that the sheet is fed thereto, means for feeding a sheet toward the bite and into the grippers, and means for opening the grippers as the sheet is fed thereto, closing the grippers to engage the sheet while the sheet is pressed against the stop means by the feeding means, held in registration for printing, and carried away from the roll, and for opening the grippers to release the sheet at the desired delivery point.

12. A printing press including two printing members, one of which is a roll coacting with the other to form a bite, grippers carried by endless means around the roll, through the bite and away from the roll, registration stop means rigidly located circumferentially of the roll with respect to the grippers and in alignment with the grippers at the time that the sheet is fed thereto, means for feeding a sheet toward the bite and into the grippers, and means for opening the grippers as the sheet is fed thereto, closing the grippers to engage the sheet while the sheet is pressed against the stop means by the feeding means, held in registration for printing, and carried away from the roll, and for opening the grippers to release the sheet at the desired delivery point, said roll being free of sheet-gripping means other than the grippers carried by the endless means.

13. An offset printing press including a blanket roll, a platen above the blanket roll, registration stop means carried by the blanket roll, feeding means adapted to feed sheets against the stop means, grippers associated with the blanket roll at least at the time a sheet is fed to the stop means, and means for holding said grippers open at that time and for closing at least part of them while the sheet is pressed against the stop means to hold the sheet in registration, the grippers being carried by endless means around the blanket roll and away therefrom for stripping the sheet from the blanket roll and delivering it at the desired point of delivery; said blanket roll being free of sheet-gripping means other than the grippers carried by the endless means.

14. The combination of a printing press including a printing roll, chains extending partly around the axis of the printing roll, rotating with the printing roll and extending away therefrom, gripping means carried by the chains and at times rigidly disposed with respect to the printing roll, means for feeding a sheet to the gripping means, and in predetermined registration with the printing roll, means for opening the gripping means to receive a sheet as it is fed to the gripping means and for closing the gripping means after the sheet is fed thereto and while the gripping means is held rigidly disposed with respect to the printing roll, and means for again opening the gripping means after the gripping means has carried the sheet away from the printing roll to release the sheet at the desired delivery point said chains being endless and carrying said gripping means around a loop to turn the sheet over between the printing of the sheet and the release of the sheet whereby the printed face of the sheet is visible when delivered.

15. The combination of a printing press including a printing roll, chains extending partly around the axis of the printing roll, rotating with the printing roll and extending away therefrom, gripping means carried by the chains and at times rigidly disposed with respect to the printing roll, means for feeding a sheet to the gripping means, and in predetermined registration with the printing roll, means for opening the gripping means to receive a sheet as it is fed to the gripping means and for closing the gripping means after the sheet is fed thereto and while the gripping means is held rigidly disposed with respect to the printing roll, and means for again opening the gripping means after the gripping means has carried the sheet away from the printing roll to release the sheet at the desired delivery point, said feeding and registering means including stop means positioned uniformly with respect to the printing roll each time the gripping means receives a sheet for cooperating with the gripping means and accurately registering a sheet with respect to the printing roll.

16. A printing press including two printing members, one of which is a roll coacting with the other to form a bite, a set of grippers carried by endless means around the roll, through the bite and away from the roll, registration stop means having the same position circumferentially of the roll for successive sheets fed thereto and, at the time each sheet is fed thereto, being rigidly located circumferentially of the roll with respect to the grippers and in alignment with the grippers, means for feeding a sheet toward the bite into the grippers and against the stop means, and means for opening the grippers as the sheet is fed thereto, closing the grippers to engage the sheet while the sheet is pressed against the stop means by the feeding means, held in registration for printing, and carried away from the roll, and for opening the grippers to release the sheet at the desired delivery point.

17. A printing press including printing rolls forming a bite therebetween, and chain registration-delivery means including sprockets rigidly mounted with respect to one of said rolls and rotating therewith, a pair of chains extending around said sprockets and each having a length corresponding to a number of revolutions of said sprockets and a gripping unit carried by said chains and cooperating with said rolls to deliver sheets to the bite for separate printings by said rolls, means for feeding a sheet for each said printing and positioning it to be gripped by the gripping unit in a predetermined position for producing a predetermined registration relative to the printing rolls when the gripping unit carries the sheet to the printing position whereby successive printings of the same sheet by said rolls will be in substantially perfect registry independently of the position of the gripping unit relative to the printing rolls, and means for opening the gripping unit and closing it upon the sheet so positioned; said gripping unit from the time that it closes upon the sheet until after it has carried the sheet to the position of printing being carried by portions of the chains which are in wrapped engagement with the sprockets whereby the positioning of the gripping unit with respect to the roll will be uniform during said time.

18. The combination of a printing press including a printing roll, chains extending partly around the axis of the printing roll, rotating with the printing roll and extending away therefrom, gripping means carried by the chains and at times rigidly disposed with respect to the printing roll, means for feeding a sheet to a predetermined disposition in the path of the gripping means for registration in which disposition it may be seized by the gripping means while the gripping means is rigidly disposed as stated, means for opening the gripping means to receive a sheet and for closing the gripping means upon the sheet in said disposition while the gripping means is held rigidly disposed with respect to the printing roll, and means for again opening the gripping means after the gripping means has carried the sheet away from the printing roll to release the sheet at the desired delivery point, said feeding and registering means including stop means positioned uniformly for different printings to obtain uniform positioning of different sheets in said predetermined position to produce uniform registration in printing with said printing roll.

19. A printing press including a pair of printing members, one of which is a roll forming a bite with the other, chain-registration delivery means including sprockets rigidly mounted with respect to said roll and rotating therewith, a pair of endless chains extending around said sprockets and away therefrom and a gripping unit carried by said chains for delivering sheets to said bite, registration stop means, means for feeding successive sheets into the path of the gripping unit around said sprockets and against said registration stop means, all of the sheets to be printed by said printing members being fed against the same registration stop means whereby variations between different stop means are avoided, and means for opening the gripping unit and closing it upon a sheet while the longitudinal position of the sheet is determined by said registration stop means, said gripping unit from the time that it closes upon the sheet until after it has carried the sheet to the bite being carried by portions of the chains which are in wrapped engagement with the sprockets whereby the positioning of the gripping unit with respect to the roll will be uniform during said time.

20. A printing press including a pair of printing members, one of which is a roll forming a bite with the other, chain-registration delivery means including sprockets rigidly mounted with respect to said roll and rotating therewith, a pair of endless chains extending around said sprockets and away therefrom and a gripping unit carried by said chains for delivering sheets to said bite, registration stop means, means for feeding successive sheets into the path of the gripping unit around said sprockets and against said registration stop means, all of the sheets to be printed by said printing members being fed against said registration stop means uniformly positioned, and means for opening the gripping unit and closing it upon a sheet while the longitudinal position of the sheet is determined by said registration stop means, said gripping unit from the time that it closes upon the sheet until after it has carried the sheet to the bite being carried by portions of the chains which are in wrapped engagement with the sprockets whereby the positioning of the gripping unit with respect to the roll will be uniform during said time.

21. A printing press comprising printing rolls forming a bite therebetween, and chain registration-delivery means including sprockets rigidly mounted with respect to one of said rolls and rotating therewith, a pair of chains extending around said sprockets, each having a length corresponding to a number of revolutions of said sprockets and a plurality of gripping units carried by the chains and cooperating with said rolls to deliver sheets to the bite for separate printings by said rolls, means for feeding a sheet to each gripping unit while it is supported on said sprockets, registering the sheet relative to the printing rolls independently of the exact location of the gripping unit relative to the printing rolls, and gripping the sheet when so registered, whereby successive printings of the same sheet by said printing rolls are made with substantially perfect registration regardless of which gripping unit carries the sheet through the bite and its precise location relative to the printing rolls.

WILLIAM WARD DAVIDSON.